US009401756B2

United States Patent
Tran et al.

(10) Patent No.: US 9,401,756 B2
(45) Date of Patent: Jul. 26, 2016

(54) METHOD FOR CONFIGURING MULTIPLE ANTENNAS AND RELATED WIRELESS COMMUNICATION DEVICE

(75) Inventors: Jimmy Tran, Hsinchu (TW); Wen-Jiun Lin, Hsinchu (TW); Yu-Min Ho, Hsinchu (TW); Wei-Lun Chang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 411 days.

(21) Appl. No.: 13/462,824

(22) Filed: May 3, 2012

(65) Prior Publication Data

US 2013/0295914 A1    Nov. 7, 2013

(51) Int. Cl.
*H04B 7/06* (2006.01)

(52) U.S. Cl.
CPC .................... *H04B 7/0691* (2013.01)

(58) Field of Classification Search
CPC ...... H04B 7/0871; H04B 7/0404; H04B 7/10; H04B 7/0608; H04B 7/02; H04B 7/0632; H04B 17/336; H04B 7/04; H04B 7/0602; H04B 7/0689; H04B 7/0802; H04L 1/06; H04L 27/2626; H04L 27/2647; H04L 5/006; H04L 1/0625; H04W 16/28
USPC .................. 455/132, 133, 134, 101
See application file for complete search history.

(56) References Cited

U.S. PATENT DOCUMENTS

| | | | | |
|---|---|---|---|---|
| 5,138,327 A | * | 8/1992 | Chang ................ | H04B 7/088 342/367 |
| 6,081,566 A | * | 6/2000 | Molnar et al. ............... | 375/347 |
| 2004/0224719 A1 | | 11/2004 | Nounin | |
| 2005/0195912 A1 | * | 9/2005 | Kim et al. ..................... | 375/267 |
| 2007/0224953 A1 | | 9/2007 | Nakagawa | |
| 2009/0117859 A1 | * | 5/2009 | Smith et al. ................... | 455/78 |
| 2011/0019830 A1 | * | 1/2011 | Leibman et al. ............... | 381/60 |
| 2012/0236776 A1 | * | 9/2012 | Zhang et al. .................. | 370/312 |

FOREIGN PATENT DOCUMENTS

| | | |
|---|---|---|
| CN | 1918817 A | 2/2007 |
| CN | 1947355 A | 4/2007 |
| TW | 201216633 | 4/2012 |
| WO | WO 2005076758 A2 | 8/2005 |

* cited by examiner

*Primary Examiner* — Lester Kincaid
*Assistant Examiner* — Dung Lam
(74) *Attorney, Agent, or Firm* — Winston Hsu; Scott Margo (57) ABSTRACT

A method for configuring a plurality of antennas in a wireless communication device, including using at least a plurality of representative antennas of the plurality of antennas to receive RF signals from a cell with a specific cell identity, determining a status of an RF environment corresponding to the wireless communication device according to the received RF signals, and selecting at least an antenna from the plurality of antennas for transmission or reception of following RF signals according to the status of the RF environment.

25 Claims, 7 Drawing Sheets

METHOD FOR CONFIGURING MULTIPLE ANTENNAS AND RELATED WIRELESS COMMUNICATION DEVICE

BACKGROUND OF THE INVENTION

1. Field of the Invention

The present invention relates to a method for configuring multiple antennas and related wireless communication device, and more particularly, to a method of selecting antennas from a plurality of antennas according to a radio-frequency (RF) environment and related wireless communication device using the same.

2. Description of the Prior Art

Electronic products with wireless communication functionalities, e.g. notebook computers, personal digital assistants, etc., utilize antennas to emit and receive radio waves, to transmit or exchange radio signals, so as to access a wireless communication network. Therefore, to facilitate a user's access to the wireless communication network, an ideal antenna should maximize its bandwidth within a permitted range, while minimizing physical dimensions to accommodate the trend for smaller-sized electronic products. Additionally, with the advance of wireless communication technology, electronic products may be configured with an increasing number of antennas. For example, a long term evolution (LTE) wireless communication system and a wireless local area network standard IEEE 802.11n both support multi-input multi-output (MIMO) communication technology, i.e. an electronic product is capable of concurrently receiving/transmitting wireless signals via multiple (or multiple sets of) antennas, to vastly increase system throughput and transmission distance without increasing system bandwidth or total transmission power expenditure, thereby effectively enhancing spectral efficiency and transmission rate for the wireless communication system, as well as improving communication quality. Moreover, MIMO communication systems can employ techniques such as spatial multiplexing, beam forming, spatial diversity, pre-coding, etc. to further reduce signal interference and increase channel capacity.

Furthermore, when a wireless communication device is configured with multiple antennas for MIMO, some of the antennas can be shut down for considerations of power consumption, antenna efficiency, etc. In such a situation, how to select or switch operating antennas is a factor affecting transmission efficiency.

SUMMARY OF THE INVENTION

It is therefore an objective of the present invention to provide method for configuring multiple antennas and related wireless communication device.

The present invention discloses a method for configuring a plurality of antennas in a wireless communication device, including using at least a plurality of representative antennas of the plurality of antennas to receive radio-frequency (RF) signals from a cell with a specific cell identity, determining a status of an RF environment corresponding to the wireless communication device according to the received RF signals, and selecting at least an antenna from the plurality of antennas for transmission or reception of following RF signals according to the status of the RF environment.

The present invention further discloses a wireless communication device, including a plurality of antennas, a radio-frequency (RF) processing unit for executing a program code to operate the plurality of antennas, and a memory for storing the program code. The program code includes controlling at least a plurality of representative antennas of the plurality of antennas to receive RF signals from a cell with a specific cell identity, determining a status of an RF environment corresponding to the wireless communication device according to the received RF signals, and selecting at least an antenna from the plurality of antennas for transmission or reception of following RF signals according to the status of the RF environment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
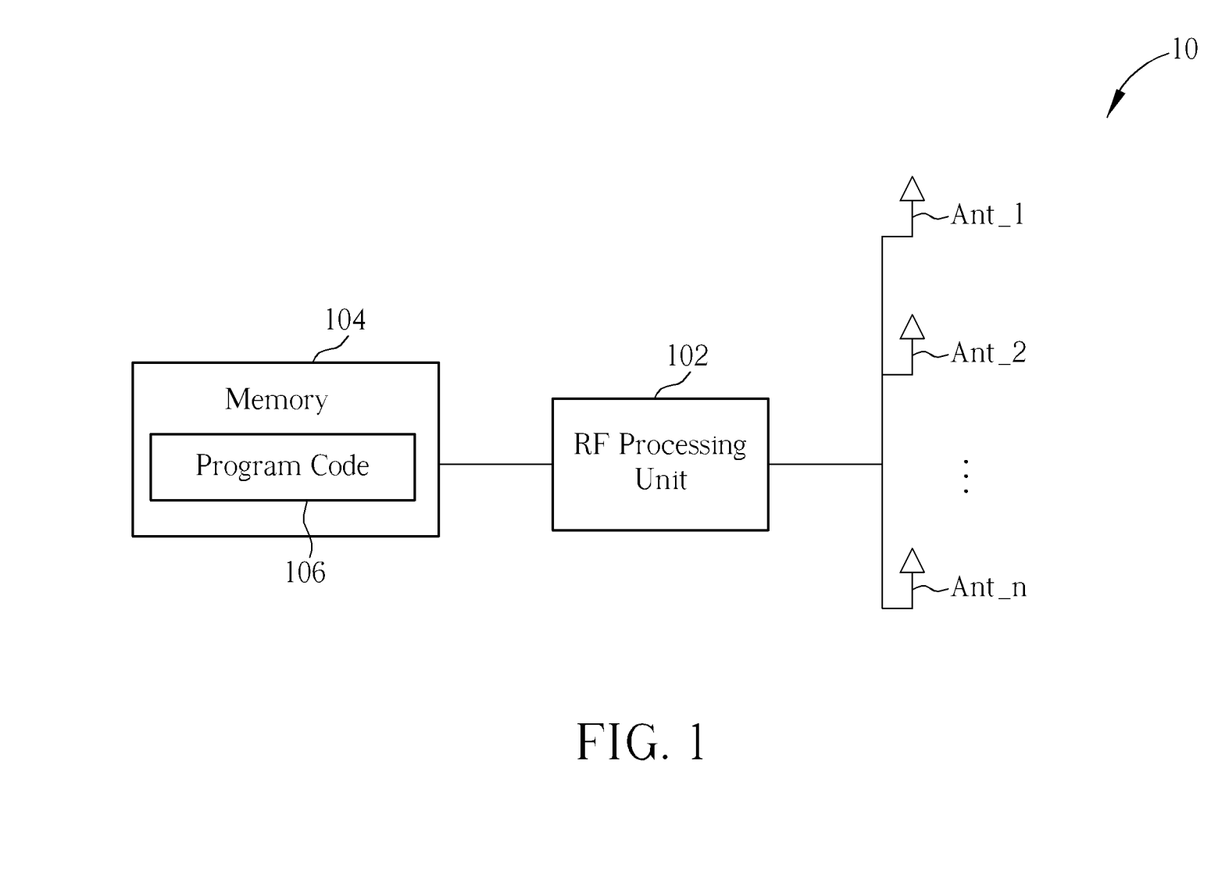
FIG. 1 is a schematic diagram of a wireless communication device with a plurality of antennas according to an embodiment of the present invention.

Please refer to FIG. 1, which illustrates a schematic diagram of a wireless communication device 10 according to an embodiment of the present invention. The wireless communication device 10 is suitable for MIMO environment (e.g., LTE system, 802.11n system, etc.), and includes antennas Ant_1-Ant_m, a radio-frequency (RF) processing unit 102, a memory 104 and a program code 106. The RF processing unit 102 executes the program code 106 stored in the memory 104, for configuring the antennas Ant_1-Ant_m, more specifically, for selecting at least an antenna from the antennas Ant_1-Ant_m for RF-signal transmission.

Figure 2:
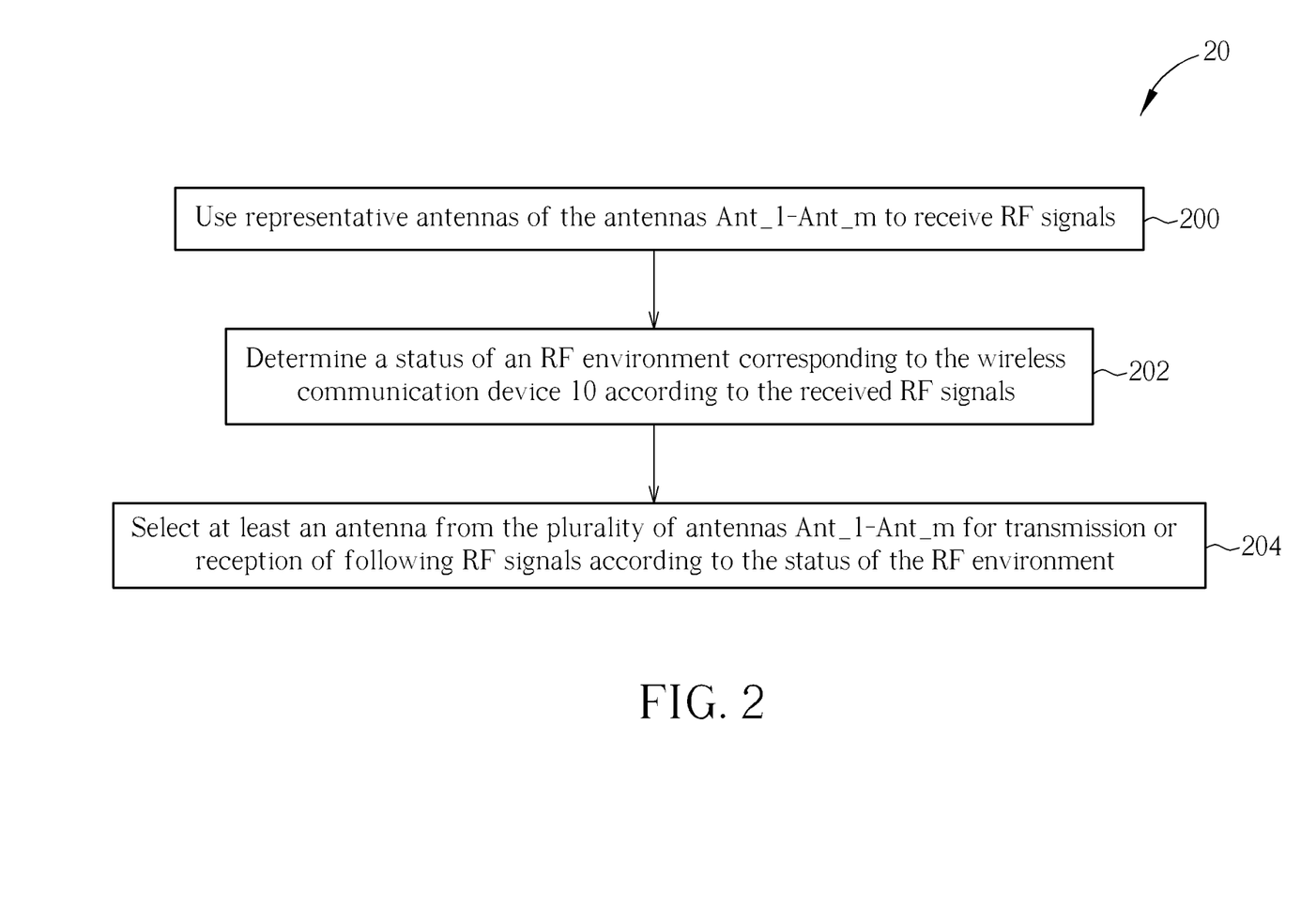
FIG. 2 is a flowchart diagram of an antenna selection process according to an embodiment of the present invention.

In detail, in the wireless communication device 10, some of the antennas Ant_1-Ant_m can be shut down for consideration of power consumption or antenna efficiency, etc. In such a situation, an antenna selection algorism is required to properly select one or more antennas from the antennas Ant_1-Ant_m for transmitting RF signals. Please refer to FIG. 2, which is a flowchart diagram of an antenna selection process 20 according to an embodiment of the present invention. The antenna selection process 20 is used to select at lease an antenna from the antennas Ant_1-Ant_m of the wireless communication device 10 for RF-signal transmission. The antenna selection process 20 can be compiled into the program code 106, and includes the following steps:

Step 200: Use representative antennas of the antennas Ant_1-Ant_m to receive RF signals.

Step 202: Determine a status of an RF environment corresponding to the wireless communication device 10 according to the received RF signals.

Step 204: Select at least an antenna from the plurality of antennas Ant_1-Ant_m for transmission or reception of following RF signals according to the status of the RF environment.

According to the antenna selection process 20, the RF processing unit 102 controls the representative antennas of the plurality of antennas Ant_1-Ant_m to receive RF signals, to determine a status of an RF environment corresponding to the wireless communication device 10 accordingly. The status of the RF environment can be determined according to at least one selected from the group consisting of Received Signal Strength Indicator (RSSI) values, Reference Signal Received Power (RSRP) values, Reference Signal Received Quality (RSRQ) values, Signal to Interference plus Noise Ratio (SINR) values, data throughputs, data rates and over-the-air (OTA) throughputs associated with the representative antennas which receive the RF signals from a cell with a specific cell identity (Cell ID). Next, the RF processing unit 102 selects at least an antenna from the antennas Ant_1-Ant_m according to the status of the RF environment, and uses the selected antennas to transmit or receive the following RF signals. Preferably, the RSRP values are compared first, and the antenna(s) associated with a maximum RSRP value are selected. If there are at least two maximum RSRP values, the SINR values corresponding to the at least two maximum RSRP values are compared. Other combinations from the RSSI values, the RSRP values, the RSRQ values, the SINR values, the data throughputs, the data rates or the OTA throughputs are also applicable for determining the status of the RF environment according to various demands. As such, the selected antenna(s) forms an optimum beam pattern for RF-signal transmission.

The antenna selection process 20 is an embodiment for selecting one or more antennas from the antennas Ant_1-Ant_m for RF-signal transmission, and those skilled in the art should readily make modifications accordingly. For example, a look-up table can be established and stored in the memory 104 for storing RSSI values, RSRP values, RSRQ values, SINR values, data throughputs, data rates, OTA throughputs and a Cell ID. Thus, when performing Step 202, the antenna selection process 20 may first calculate the RSSI values, the RSRP values, the RSRQ values, the SINR values, the data throughputs, the data rates and the OTA throughputs associated with the representative antennas, and then determine the status of the RF environment accordingly. Once the antenna(s) is selected, the RSSI values, the RSRP values, the RSRQ values, the SINR values, the data throughputs, the data rates, the OTA throughputs and the specific Cell ID into the look-up table in the memory. Furthermore, the step 200 and the step 202 of the antenna selection process 20 can be repeated to determine an averaged status of the RF environment corresponding to the wireless communication device 10.

Figure 3:
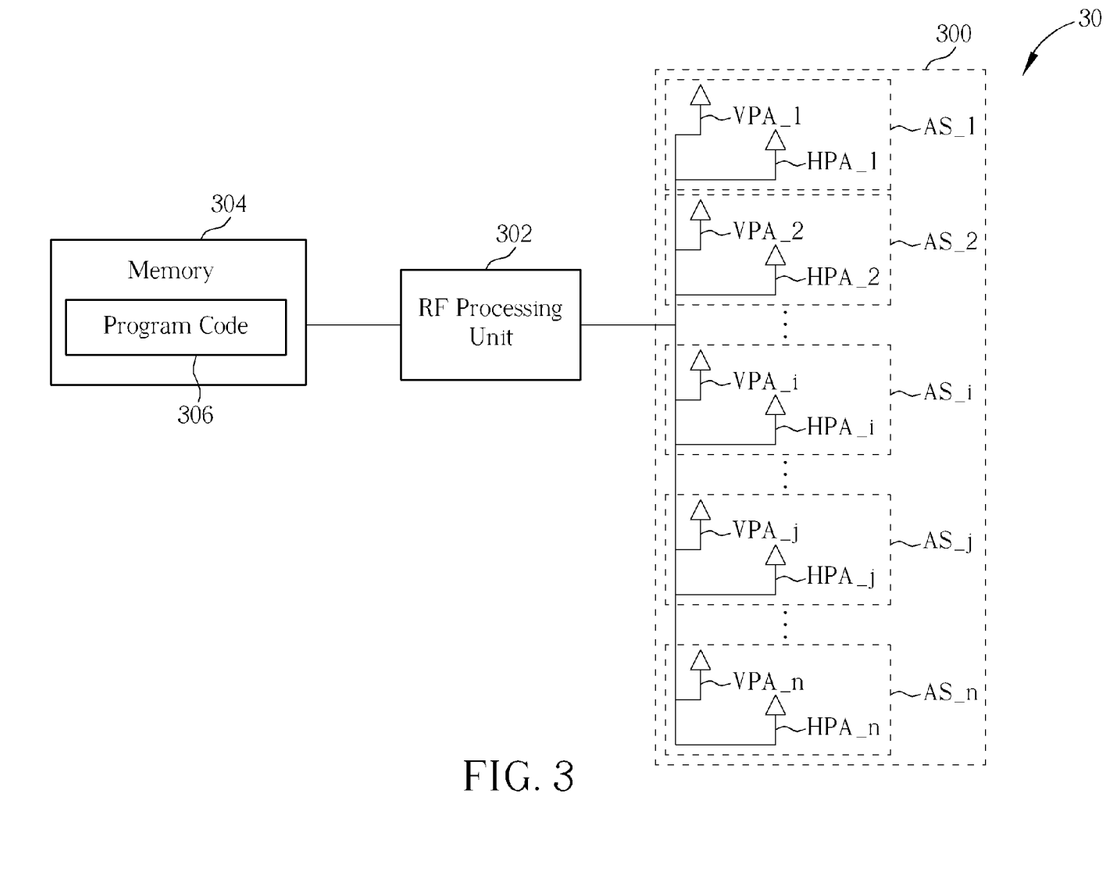
FIG. 3 is a schematic diagram of a wireless communication device with a plurality of vertically polarized antennas and horizontally polarized antennas according to an embodiment of the present invention.

Note that, in the above embodiment, the antennas Ant_1-Ant_m can be of the same type or different types, which can further be categorized into multiple sets based on system requirements. For example, please refer to FIG. 3, which is a wireless communication device 30 according to an embodiment of the present invention. The wireless communication device 30 includes an antenna array 300, an RF processing unit 302, a memory 304 and a program code 306. The antenna array 300 is derived from a complex antenna as disclosed in U.S. patent application Ser. No. 13/100,303, and composed of antenna sets AS_1-AS_n. Each of the antenna sets AS_1-AS_n includes one of vertically polarized antennas VPA_1-VPA_n and one of horizontally polarized antennas HPA_1-HPA_n, i.e. the antenna set AS_1 includes the vertically polarized antenna VPA_1 and the horizontally polarized antenna HPA_1, the antenna set AS_2 includes the vertically polarized antenna VPA_2 and the horizontally polarized antenna HPA_2, and so on. The RF processing unit 302 is used to execute the program code 306 stored in the memory 304, for configuring the antenna array 300, more specifically, for selecting at least an antenna from the antenna array 300 for RF-signal transmission.

Figure 4:
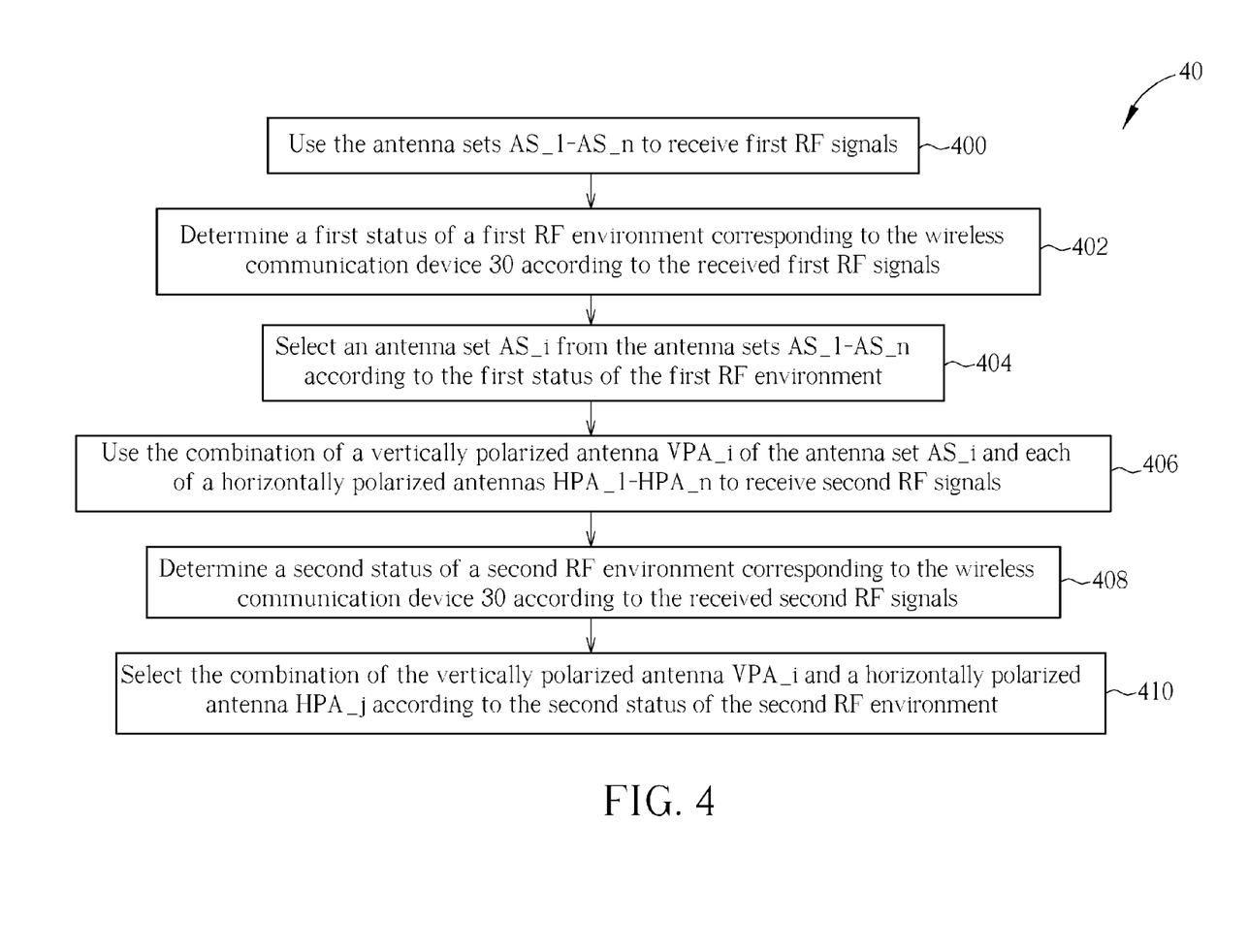
FIG. 4 is a flowchart diagram of an antenna selection process according to an embodiment of the present invention.

In detail, in the wireless communication device 30, some of the antennas in the antenna sets AS_1-AS_n can be shut down for consideration of power consumption or antenna efficiency, etc. In such a situation, an antenna selection algorism is required to properly select one or more antennas from the antenna sets AS_1-AS_n for transmitting RF signals. Since each of the antenna sets AS_1-AS_n includes a vertically polarized antenna and a horizontally polarized antenna. The algorism may be performed by selecting a vertically polarized antenna first, and then select a horizontally polarized antenna. Note that, the selected vertically polarized antenna and the selected horizontally polarized antenna are not necessarily in a same antenna set. Please refer to FIG. 4, which is a flowchart diagram of an antenna selection process 40 according to an embodiment of the present invention. The antenna selection process 40 is used to select at lease one antenna from the antenna array 300 of the wireless communication device 30 for signal transmission. The antenna selection process 40 can be compiled into the program code 306, and includes the following steps:

Step 400: Use the antenna sets AS_1-AS_n to receive first RF signals.

Step 402: Determine a first status of a first RF environment corresponding to the wireless communication device 30 according to the received first RF signals.

Step 404: Select an antenna set AS_i from the antenna sets AS_1-AS_n according to the first status of the first RF environment.

Step 406: Use the combination of a vertically polarized antenna VPA_i of the antenna set AS_i and each of the horizontally polarized antennas HPA_1-HPA_n to receive second RF signals.

Step 408: Determine a second status of a second RF environment corresponding to the wireless communication device 30 according to the received second RF signals.

Step 410: Select the combination of the vertically polarized antenna VPA_i and a horizontally polarized antenna HPA_j according to the second status of the second RF environment.

According to the antenna selection process 40, the RF processing unit 302 controls the antenna sets AS_1-AS_n to receive first RF signals, to determine a first status of a first RF environment corresponding to the wireless communication device 30 accordingly. The first status of the first RF environment can be determined according to at least one selected from the group consisting of first RSSI values, first RSRP values, first RSRQ values, first SINR values, first data throughputs, first data rates, and first over-the-air (OTA) throughputs associated with the antenna sets AS_1-AS_n which receive the first RF signals from a cell with a specific cell ID. Next, the RF processing unit selects an antenna set AS_i according to the first status of the first RF environment. As described in the antenna selection process 20, the first RSRP values are compared first, and the antenna set associated with a maximum first RSRP value is selected; if there are at least two maximum first RSRP values, the first SINR values corresponding to the at least two maximum first RSRP values are compared. Other combinations from the first RSSI values, the first RSRP values, the first RSRQ values, the first SINR values, the first data throughputs, the first data rates, or the first OTA throughputs are also applicable for determining the status of the RF environment according to various demands.

After the antenna set AS_i is selected, the RF processing unit 302 further configures the vertically polarized antenna VPA_i of the antenna set AS_i and each of the horizontally polarized antennas HPA_1-HPA_n to receive second RF signals, to determine a second status of a second RF environment corresponding to the wireless communication device 30 accordingly. Also, the second status of the second RF environment can be determined according to at least one selected from the group consisting of second RSSI values, second RSRP values, second RSRQ values, second SINR values, second data throughputs, second data rates and second OTA throughputs associated with all combinations between the vertically polarized antenna VPA_i and all horizontally polarized antennas HPA_1-HPA_n, which receive the second RF signals from the same cell. Next, the RF processing unit 302 selects the vertically polarized antenna VPA_i and the horizontally polarized antenna HPA_j according to the second status of the second RF environment. Similarly, the second RSRP values are compared first, and the combination of the vertically polarized antenna in the selected antenna set and a horizontally polarized antenna associated with a maximum second RSRP value are selected; if there are at least two maximum second RSRP values, the second SINR values corresponding to the at least two maximum second RSRP values are compared. Other combinations from the second RSSI values, the second RSRP values, the second RSRQ values, the second SINR values, the second data throughputs, the second data rates or the second OTA throughputs are also applicable for determining the status of the RF environment according to various demands. The combination of the vertically polarized antenna in the selected antenna set and the horizontally polarized antenna forms an optimum beam pattern for following RF-signal transmission or reception. Finally, the second RSSI values, the second RSRP values, the second RSRQ values, the second SINR values, the second data throughputs, the second data rates, the OTA throughputs and the specific Cell ID are updated into a look-up table stored in the memory 304.

Figure 5:
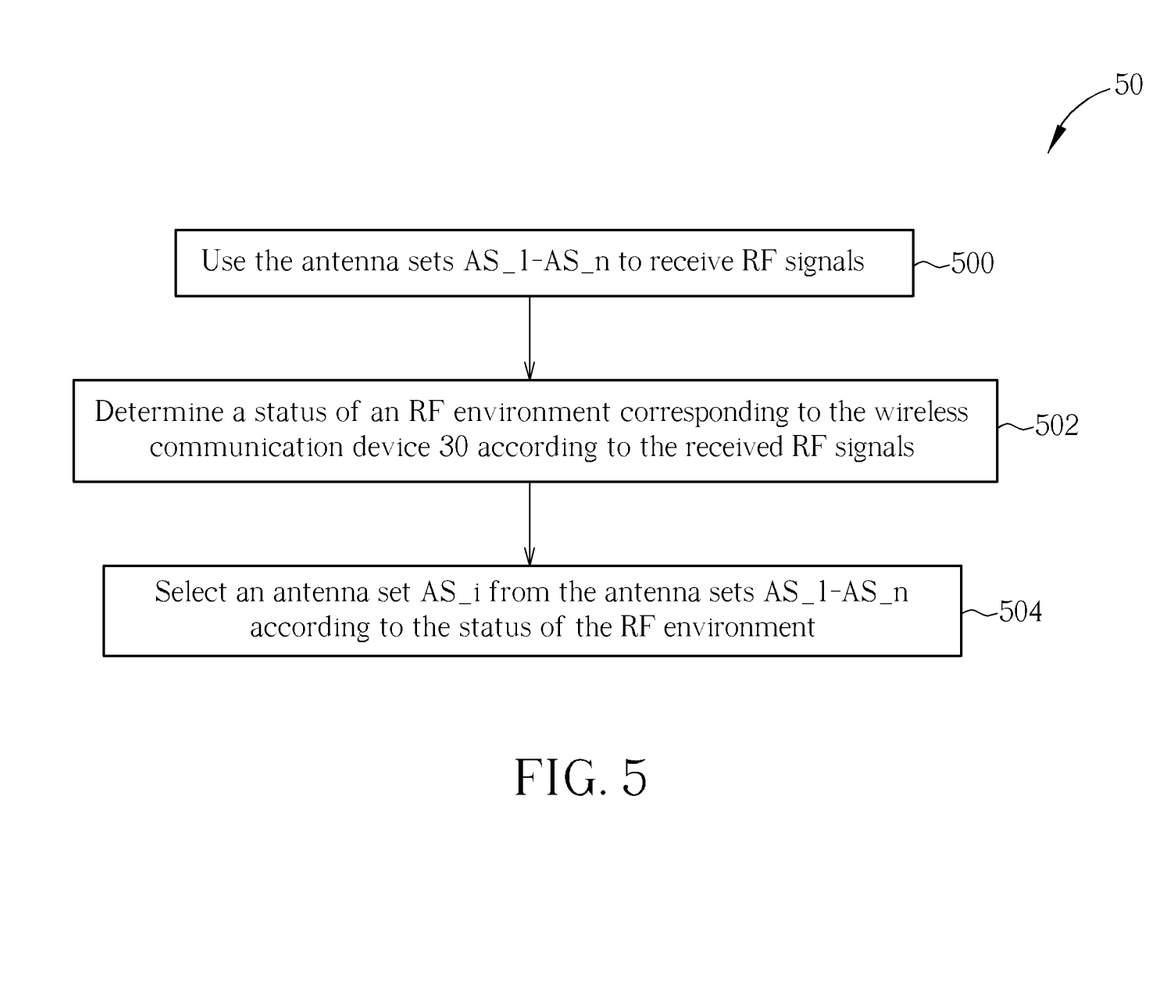
FIG. 5 is a flowchart diagram of an antenna selection process according to an embodiment of the present invention.

In another embodiment of the wireless communication device 30, a vertically polarized antenna and a horizontally polarized antenna are simultaneously selected, and the vertically polarized antenna and the horizontally polarized antenna are in a same antenna set. Please refer to FIG. 5, which is a flowchart diagram of an antenna selection process 50 according to an embodiment of the present invention. The antenna selection process 50 can be compiled into a program code, and includes the following steps:

Step 500: Use the antenna sets AS_1-AS_n to receive RF signals.

Step 502: Determine a status of an RF environment corresponding to the wireless communication device 30 according to the received RF signals.

Step 504: Select an antenna set AS_i from the antenna sets AS_1-AS_n according to the status of the RF environment.

Comparing to the antenna selection process 40, the steps 500/502/504 are the same as the steps 400/402/404 respectively; therefore, the detailed description for the steps 500, 502 and 504 is omitted herein. The antenna selection process 50 is a simplified process of the antenna selection process 40, since the wireless communication device 30 selects an antenna set for RF-signal transmission without further steps for selecting a vertically polarized antenna and a horizontally polarized antenna which are not necessarily in a same antenna set. According to the antenna selection process 50, after the antenna set AS_i is selected, and the combination of the vertically polarized antenna VPA_i and the horizontally polarized antenna HPA_i forms an optimum beam pattern for RF-signal transmission or reception.

Figure 6:
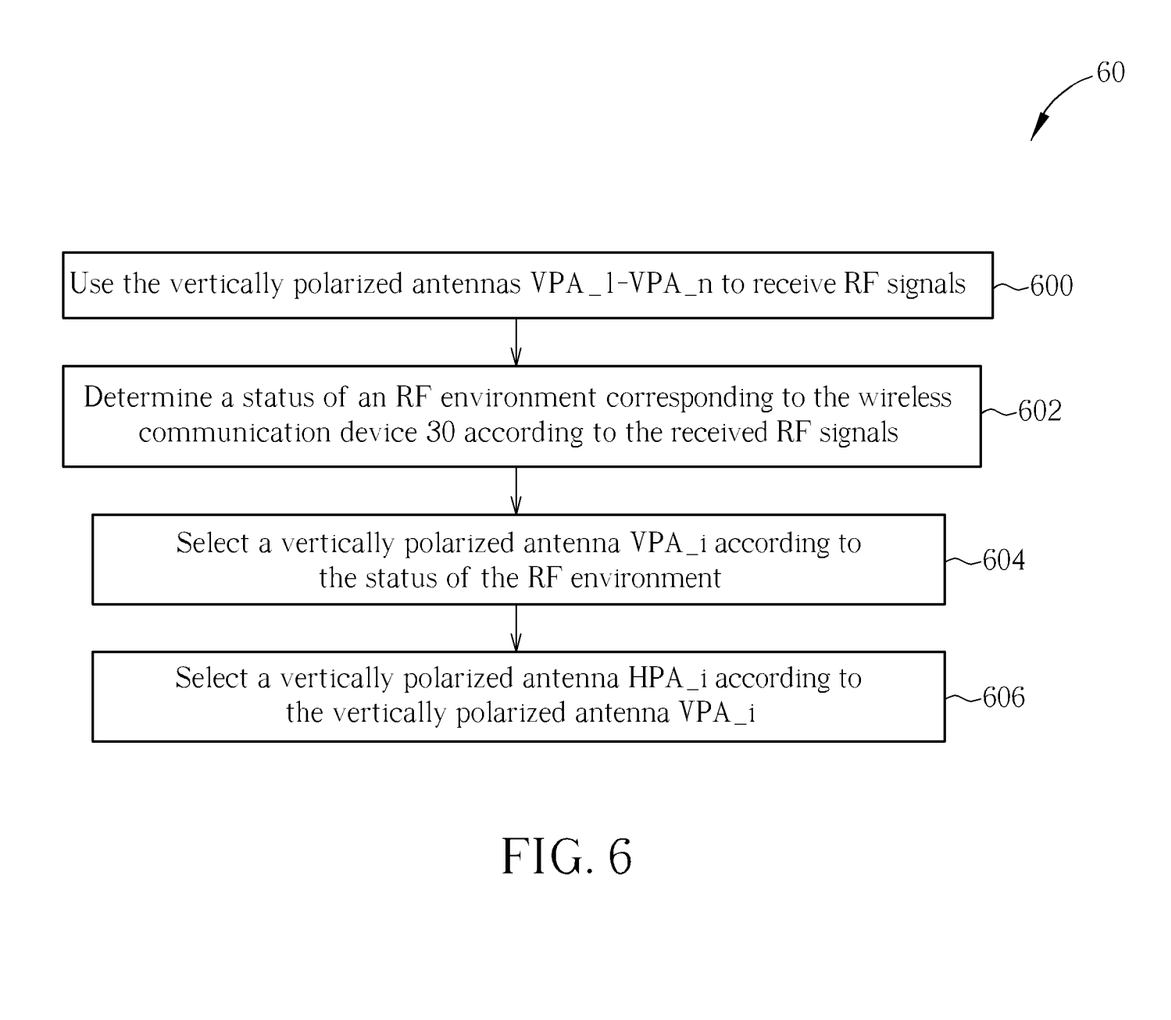
FIG. 6 is a flowchart diagram of an antenna selection process according to an embodiment of the present invention.

In addition, the RF processing unit 302 can control only the vertically polarized antennas VPA_1-VPA_n to receive RF signals for selecting an antenna set to perform RF-signal transmission. In an embodiment, a vertically polarized antenna is selected, and a horizontally polarized antenna is selected according to the vertically polarized antenna, i.e., the vertically polarized antenna and the horizontally polarized antenna are in a same antenna set. Please refer to FIG. 6, which is a flowchart diagram of an antenna selection process 60 according to an embodiment of the present invention. The antenna selection process 60 is used to select a vertically polarized antenna and a horizontally polarized antenna from the antenna array 300 of the wireless communication device 30 for RF-signal transmission. The antenna selection process 60 can be compiled into a program code 306, and includes the following steps:

Step 600: Use the vertically polarized antennas VPA_1-VPA_n to receive RF signals.

Step 602: Determine a status of an RF environment corresponding to the wireless communication device 30 according to the received RF signals.

Step 604: Select a vertically polarized antenna VPA_i according to the status of the RF environment.

Step 606: Select a vertically polarized antenna HPA_i according to the vertically polarized antenna VPA_i.

According to the antenna selection process 60, the RF processing unit 302 controls the horizontally polarized antennas HPA_1-HPA_n to receive RF signals, to determine a status of a RF environment corresponding to the wireless communication device 30 accordingly. The status of the RF environment can be determined according to at least one selected from the group consisting of RSSI values, RSRP values, RSRQ values, SINR values, data throughputs, data rates and OTA throughputs associated with the antenna sets AS_1-AS_n which receive the RF signals from a cell with a specific cell ID. First, the RF processing unit selects a vertically polarized antenna VPA_i according to the status of the RF environment. The selecting criterion is the same as that described in the antenna selection process 20, so the selecting criterion is not described herein. Second, a horizontally polarized antenna HPA_i is selected according to the vertically polarized antenna VPA_i, because the horizontally polarized antenna HPA_i and the vertically polarized antenna VPA_i are in a same antenna set AS_i.

The advantage of the antenna selection process 60 is that execution time and power consumption are reduced, because the horizontally polarized antennas HPA_1-HPA_n are not used to receive RF signals for antenna selection.

Figure 7:
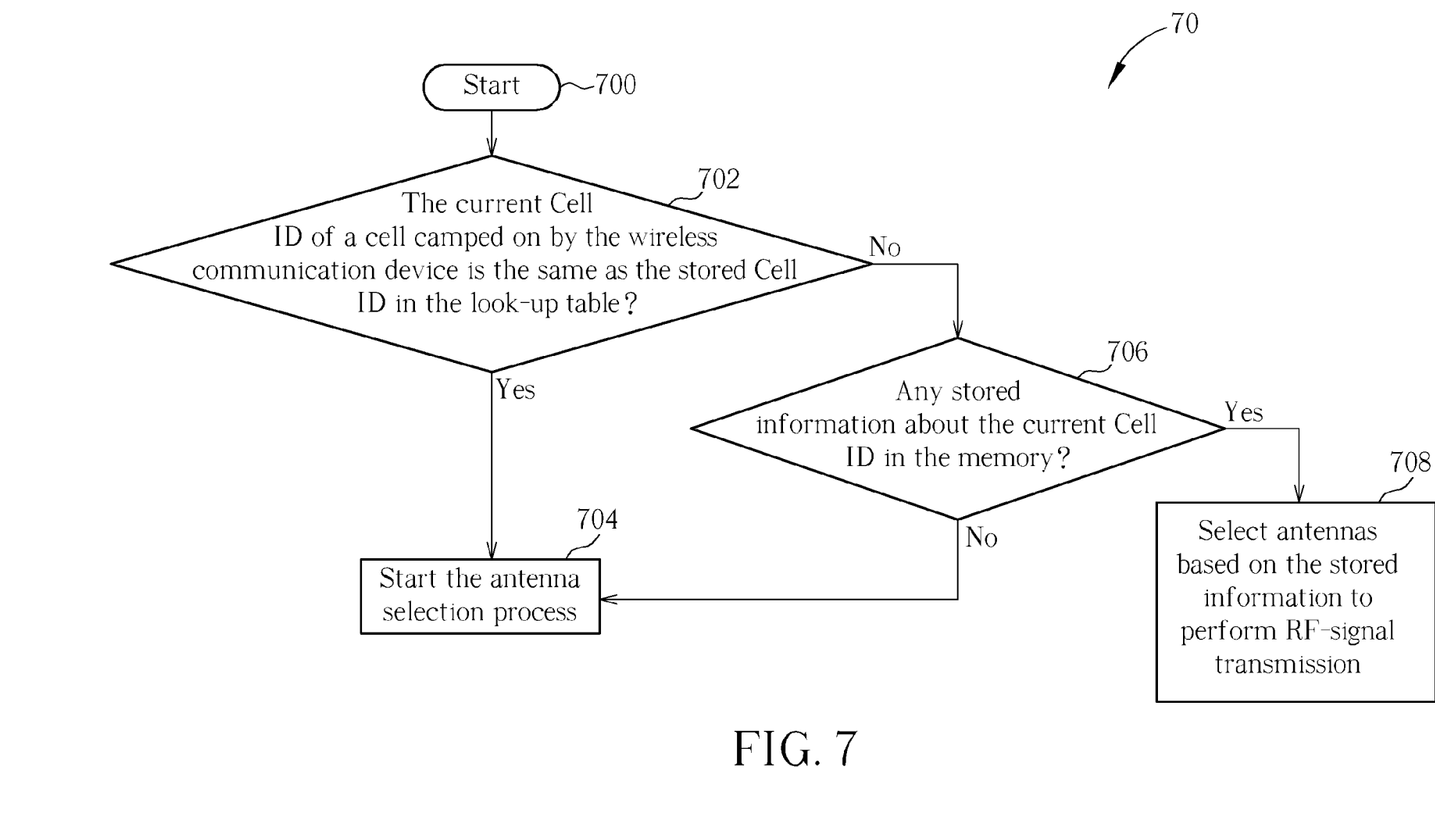
FIG. 7 is a flowchart diagram of a Cell ID check process according to an embodiment of the present invention.

In the present invention, the wireless communication device performs the antenna selection process at a power-up or idle state. The power-up state means that the wireless communication device is just powered on, and the idle state means that the wireless communication device has to perform the antenna selection process in an exceptional case. Please refer to FIG. 7, which is a flowchart of a Cell ID check process 70 according to an embodiment of the present invention. In detail, the wireless communication device checks the RF environment periodically. Preferably, the wireless communication device enters the exceptional case when the RF environment indicates that the SINR value measured by the wireless communication device decreases more than a first programmable variable threshold, or the SINR value is less than a second programmable variable threshold. In the present embodiment, the first programmable variable threshold is 10 dB, and the second programmable variable threshold is 0 dB. However, other first programmable variable thresholds and second programmable variable thresholds may be adopted for various networks or environments. In the exceptional case, the wireless communication device checks the current Cell ID of a cell camped on by the wireless communication device. If the current Cell ID is the same as the stored Cell ID in the look-up table, the wireless communication device starts the antenna selection process as in the power-up mode. Otherwise (i.e., the wireless communication device has been handover to another base station) the wireless communication device further checks if there is any stored information about the current Cell ID in the look-up table. If yes, the wireless communication device selects antennas based on the stored information to perform RF-signal transmission. Because the stored information contains the selected antennas, the wireless communication device does not need to perform the antenna selection process again. Otherwise the wireless communication device starts the antenna selection process as in power-up mode. As such, the Cell ID check process 70 includes the following steps:

Step 700: Start.

Step 702: Check if the current Cell ID of a cell camped on by the wireless communication device is the same as the stored Cell ID in the look-up table. If yes, go to Step 704; otherwise, go to Step 706.

Step 704: Start the antenna selection process.

Step 706: Check if there is any stored information about the current Cell ID in the memory. If yes, go to Step 708; otherwise, go to Step 704.

Step 708: Select antennas based on the stored information to perform RF-signal transmission.

Please note that, the present invention is not limited to the above embodiments. For example, the antenna selection process in the present invention can be extended to selection of multiple vertically polarized antennas and multiple horizontally polarized antennas to form an optimum beam pattern for RF-signal transmission.

To sum up, the wireless communication with multiple antennas of the present invention can select at least an antenna, so as to reduce power consumption and form an optimum beam pattern for RF-signal transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna configuring method, utilized in a wireless communication device, the wireless communication device comprising a plurality of sets of antennas, wherein each set of antennas comprises a first kind of antennae and a second kind of antennae, the method comprising:

the wireless communication device using the plurality sets of antennas to receive first radio-frequency (RF) signals from a first cell with a specific cell identity (Cell ID);

the wireless communication device determining a first status of a first RF environment corresponding to the wireless communication device according to the first received RF signals;

the wireless communication device selecting a set of antenna from the plurality sets of antennas according to the first status of the first RF environment;

the wireless communication device selecting a first antenna that uses the first kind of antenna from the selected set of antenna;

the wireless communication device using the first antenna and each of the second kind of antennas from the plurality of sets of antennas to receive second RF signals;

the wireless communication device selecting a second antenna that uses the second kind of antennas from the plurality sets of antennas according to the second RF signals; and the wireless communication device selecting a combination of antennas, comprising the first antenna and the second antenna, for transmission or reception of following RF signals.

2. The method of claim 1, wherein the first status of the first RF environment is determined according to at least one selected from the group consisting of a plurality of Received Signal Strength Indicator (RSSI) values, a plurality of Reference Signal Received Power (RSRP) values, a plurality of Reference Signal Received Quality (RSRQ) values, a plurality of Signal to Interference plus Noise Ratio (SINR) values, a plurality of data throughputs, a plurality of data rates and a plurality of over-the-air (OTA) throughputs associated with the plurality of selective combinations of different antennas.

3. The method of claim 2, wherein the plurality of RSSI values, the plurality of RSRP values, the plurality of RSRQ values, the plurality of SINR values, the plurality of data throughputs, the plurality of data rates, the plurality of OTA throughputs and the specific Cell ID are updated into a look-up table in the wireless communication device after measured by the wireless communication device.

4. The method of claim 1, wherein each of the plurality of selective combinations of different antennas comprises an antenna set.

5. The method of claim 1, wherein the first kind of antennas are vertically polarized antennas, and the second kind of antennas are horizontally polarized antennas.

6. The method of claim 1, wherein the first kind of antennas are horizontally polarized antennas, and the second kind of antennas are vertically polarized antennas.

7. The method of claim 1, wherein the wireless communication device is in a power-up mode.

8. The method of claim 1, wherein the wireless communication device is in an idle mode.

9. The method of claim 8, wherein the wireless communication device enters the idle mode when an SINR value measured by the wireless communication device decreases more than a first programmable variable threshold, and a new Cell ID of a second cell camped on by the wireless communication device is identical to an original Cell ID stored in a look-up table.

10. The method of claim 8, wherein the wireless communication device enters the idle mode when an SINR value measured by the wireless communication device decreases more than a first programmable variable threshold, and a new Cell ID of a second cell camped on by the communication device different from an original Cell ID stored in the look-up table, and no information of the new Cell ID is stored in a look-up table.

11. The method of claim 8, wherein the wireless communication device enters the idle mode when an SINR value measured by the wireless communication device is less than a second programmable variable threshold, and a new Cell ID of a second cell camped on by the wireless communication device is identical to an original Cell ID stored in a look-up table.

12. The method of claim 8, wherein the wireless communication device enters the idle mode when an SINR value measured by the wireless communication device is less than a second programmable variable threshold, and a new Cell ID of a second cell camped on by the communication device different from an original Cell ID stored in the look-up table, and no information of the new Cell ID is stored in a look-up table.

13. A wireless communication device, comprising:
a plurality of sets of antennas, each set comprising a first kind of antenna and a second kind of antenna;
a radio-frequency (RF) processing unit; and
a memory for storing a program code;
wherein the program code instructs the RF processing unit to execute the following steps:
controlling the plurality sets of antennas to receive first radio-frequency (RF) signals from a first cell with a specific cell identity (Cell ID);
determining a first status of a first RF environment corresponding to the wireless communication device according to the first received RF signals;
selecting a set of antenna from the plurality sets of antennas according to the first status of the first RF environment;
selecting a first antenna that uses the first kind of antenna from the selected set of antenna;
using the first antenna and each of the second kind of antennas from the plurality of sets of antenna to receive second RF signals;
selecting a second antenna from the second kind of antennae that uses the plurality sets of antennas according to the second RF signals; and
selecting a combination of antennas, comprising the first antenna and the second antenna, for transmission or reception of following RF signals.

14. The wireless communication device of claim 13, wherein the first status of the first RF environment is determined according to at least one selected from the group consisting of a plurality of Received Signal Strength Indicator (RSSI) values, a plurality of Reference Signal Received Power (RSRP) values, a plurality of Reference Signal Received Quality (RSRQ) values, a plurality of Signal to Interference plus Noise Ratio (SINR) values, a plurality of data throughputs, a plurality of data rates and a plurality of over-the-air (OTA) throughputs associated with the plurality of selective combinations of different antennas.

15. The wireless communication device of claim 14, wherein the plurality of RSSI values, the plurality of RSRP values, the plurality of RSRQ values, the plurality of SINR values, the plurality of data throughputs, the plurality of data rates, the plurality of OTA throughputs and the specific Cell ID are updated into a look-up table after measured by the wireless communication device.

16. The wireless communication device of claim 15, wherein the look-up table is stored in the memory.

17. The wireless communication device of claim 13, wherein each of the plurality of selective combinations of different antennas comprises an antenna set.

18. The wireless communication device of claim 13, wherein the first kind of antennas are vertically polarized antennas, and the second kind of antennas are horizontally polarized antennas.

19. The wireless communication device of claim 13, wherein the first kind of antennas are horizontally polarized antennas, and the second kind of antennas are vertically polarized antennas.

20. The wireless communication device of claim 13, wherein the wireless communication device is in a power-up mode.

21. The wireless communication device of claim 13, wherein the wireless communication device is in an idle mode.

22. The wireless communication device of claim 21, wherein the wireless communication device enters the idle mode when an SINR value measured by the wireless communication device decreases more than a first programmable variable threshold, and a new Cell ID of a second cell camped on by the wireless communication device is identical to an original Cell ID stored in a look-up table.

23. The wireless communication device of claim 21, wherein the wireless communication device enters the idle mode when an SINR value measured by the wireless communication device decreases more than a first programmable variable threshold, and a new Cell ID of a second cell camped on by the communication device different from an original Cell ID stored in the look-up table, and no information of the new Cell ID is stored in a look-up table.

24. The wireless communication device of claim 21, wherein the wireless communication device enters the idle mode when an SINR value measured by the wireless communication device is less than a second programmable variable threshold, and a new Cell ID of a second cell camped on by the wireless communication device is identical to an original Cell ID stored in a look-up table.

25. The wireless communication device of claim 21, wherein the wireless communication device enters the idle mode when an SINR value measured by the wireless communication device is less than a second programmable variable threshold, and a new Cell ID of a second cell camped on by the communication device different from an original Cell ID stored in the look-up table, and no information of the new Cell ID is stored in a look-up table.

* * * * *